(12) United States Patent
Bartel et al.

(10) Patent No.: US 10,569,453 B2
(45) Date of Patent: Feb. 25, 2020

(54) THERMOPLASTIC COMPOSITE PART AND METHOD OF FABRICATION

(71) Applicant: THE BOEING COMPANY, Chicago, IL (US)

(72) Inventors: Aaron William Bartel, Portland, OR (US); Wallace Chan, Bothell, WA (US); Paul B. Diep, Bothell, WA (US); Bernhard Dopker, Bellevue, WA (US); David Gideon, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 466 days.

(21) Appl. No.: 14/720,645

(22) Filed: May 22, 2015

(65) Prior Publication Data

US 2016/0339611 A1    Nov. 24, 2016

(51) Int. Cl.
| | | |
|---|---|---|
| *B29C 43/18* | (2006.01) | |
| *B29L 9/00* | (2006.01) | |
| *B29C 65/00* | (2006.01) | |
| *B29K 705/00* | (2006.01) | |
| *B29C 51/14* | (2006.01) | |
| *B29C 65/18* | (2006.01) | |
| *B29L 31/00* | (2006.01) | |

(52) U.S. Cl.
CPC .............. *B29C 43/18* (2013.01); *B29C 51/14* (2013.01); *B29C 65/18* (2013.01); *B29C 66/543* (2013.01); *B29C 66/545* (2013.01); *B29C 66/721* (2013.01); *B29C 66/73921* (2013.01); *B29C 66/8322* (2013.01); *B29K 2705/00* (2013.01); *B29L 2009/00* (2013.01); *B29L 2009/001* (2013.01); *B29L 2031/771* (2013.01)

(58) Field of Classification Search
CPC ....... B29C 43/19; B29C 51/14; B29C 66/721; B29C 66/73921; B29C 66/8322; B29C 43/18; B29C 9/00; B29C 65/18; B29K 2705/00; B29K 2009/00; B29K 2009/001; B29L 2009/00; B29L 2031/771; B29L 31/00
USPC .............. 428/292.1; 52/745.02, 79.1; 29/48; 432/106; 34/128
See application file for complete search history.

(56) References Cited

U.S. PATENT DOCUMENTS

| | | | | |
|---|---|---|---|---|
| 3,018,210 A | * | 1/1962 | Frieder | .................. A42B 3/063 156/228 |
| 5,073,244 A | * | 12/1991 | Korner | ................. B65D 90/028 204/242 |
| 2010/0000268 A1 | * | 1/2010 | Kohne | .................. D06F 39/024 68/235 R |
| 2011/0023202 A1 | | 2/2011 | Vanarsdalen et al. | |
| 2013/0122246 A1 | * | 5/2013 | Berger | ...................... F16B 5/08 428/119 |

* cited by examiner

*Primary Examiner* — Camie S Thompson
(74) *Attorney, Agent, or Firm* — McDonnell Boehnen Hulbert & Berghoff LLP

(57) ABSTRACT

An assembly of thermoplastic parts for forming a final composite part is presented where the assembly includes at least two prefabricated shells fabricated of thermoplastic. Each prefabricated shell has substantially the same shape as the final composite part and where the shapes of the prefabricated shells have dimensions that allow the prefabricated shells to be assembled into a nest for placement into a mold.

15 Claims, 5 Drawing Sheets

THERMOPLASTIC COMPOSITE PART AND METHOD OF FABRICATION

TECHNICAL FIELD

This disclosure generally relates to thermoplastic composite parts. More specifically, the thermoplastic composite parts are formed from a plurality of prefabricated shells nested together and thermoformed to bond the shells together along a shared melt zone.

BACKGROUND

Fittings and parts that exhibit high strength-to-weight structures are used throughout many industries, in particular in the aircraft and aerospace industries. For example, such fittings are used to secure airplane seats to floor tracks or to allow overhead storage bins to open and close or as vertical tail supports. Such components are typically fabricated from metals, such as aluminum and titanium, and rely on very weight efficient configurations to obtain the desired strength, stiffness, etc. These metal fittings and parts can be expensive to manufacture and can result in multiple assembly steps, such as deburring or fay surface sealing of joined surfaces, such as lap joints. To reduce costs, fabrication of such fittings and parts using non-metallic materials, such as plastics, has been tried, but difficulties may result when fabricating a thick part. Additionally, starting with a thicker single sheet of plastic to form the final resultant part may not solve the problem when the part has a complex geometry, for example, a "bathtub" shaped fitting because starting with a thick single sheet may not easily conform to the contours of a mold. The use of thermoset materials may have drawbacks, such as multiple processing steps and/or lower fracture toughness compared to thermoplastics.

SUMMARY

The present disclosure is directed to an assembly of thermoplastic parts for forming final composite parts or fittings. The assembly comprises a first prefabricated shell of thermoplastic configured as a first shape substantially the same as the final composite part and a second prefabricated shell comprising thermoplastic configured as a second shape that is substantially the same as the first shape. The first shape and second shape have dimensions such that the first and second prefabricated shells can be assembled into a nest for placement into a mold.

Other materials can be included in the assembly of the present disclosure, including one or more doublers configured for positioning between adjacent nested shells. Additionally, reinforcing fibers can be incorporated into one more of the prefabricated shells having a fixed orientation such that when the shells are nested a predetermined orientation of the fibers can be obtained in the finished thermoplastic composite part.

The thermoplastic composite part may also contain an integrated attachment component, where the attachment component may be metallic and located between adjacent nested shells or incorporated into one or more shells during fabrication of the individual shells prior to nesting. The attachment component can include one or more of a lug, a bearing, a sub-fitting, or combinations thereof. In some cases it is beneficial to include a tool index component in order to fix or stabilize the attachment component as the attachment component is integrated into the final composite part or fitting.

The present disclosure is also directed to final composite parts and fitting fabricated using the assemblies of the present disclosure.

The present disclosure also includes methods of fabricating the above-described thermoplastic assemblies and final composite parts where two or more single shells are assembled in a predetermined manner to form a nest of the single shells and placed within a mold. Heat and pressure are applied to the nest to thermoform or compression mold the assembly within the mold to create a shared melt zone(s) between the single shells that bonds the single shells together to produce a formed composite part. The formed part is then removed from the mold. The method can also include thermoform or compression molding a pattern cut from a thermoplastic material to fabricate the individual single shells.

The patterns used to form the single shells can comprise reinforcing fibers such that the single shells have a defined fiber orientation. These shells can then be assembled in the nest such that the fiber orientations of adjacent shells follows a predetermined design. One or more doublers can also be placed adjacent the shells during assembly of the nest. The doublers may be a metal insert, or neat resin with or without an attachment feature such as a lug or clevis. Likewise, folding darts can be cut and/or positioned on one or more shells prior to nesting such that when the nest is assembled the folding darts are aligned in a predetermined pattern. One or more attachment components can be added to the single shells and/or to the assembly of the nest.

The present disclosure also includes a method of forming a shell using a tool having a male side and a female side, where the method comprises preparing a pattern comprising thermoplastic. Once the pattern is prepared it is placed over the female side of the tool that has a shaped cavity. The male side is then aligned with the female side with the pattern in between the two sides. The male side is then pressed into the female side to cause the pattern to conform to the shaped cavity to form a shell. Once the shell is formed the shell is removed from the tool. Heat can be applied to the tool during the formation of the shell.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Disclosed embodiments will now be described more fully below with reference to the accompanying drawings, in which some, but not all of the disclosed embodiments are shown. Indeed, several different embodiments may be provided and should not be construed as limited to the embodiments set forth in this disclosure. Rather, these embodiments are provided so that this disclosure will be thorough and complete and will fully convey the scope of the disclosure to those skilled in the art.

The disclosed embodiments provide robust and low cost fittings and parts that have desired strength-to-weight ratios that may equal or surpass current metallic designs. The parts and fittings described in this present disclosure, and the methods of manufacturing such parts, provide the solution to above-mentioned drawbacks by using a plurality prefabricated shells of thermoplastic material that can be nested together within a mold and then thermoformed to bond the shells together to make a composite part. These and other advantages are described below with reference to the accompanying figures.

Figure 1:
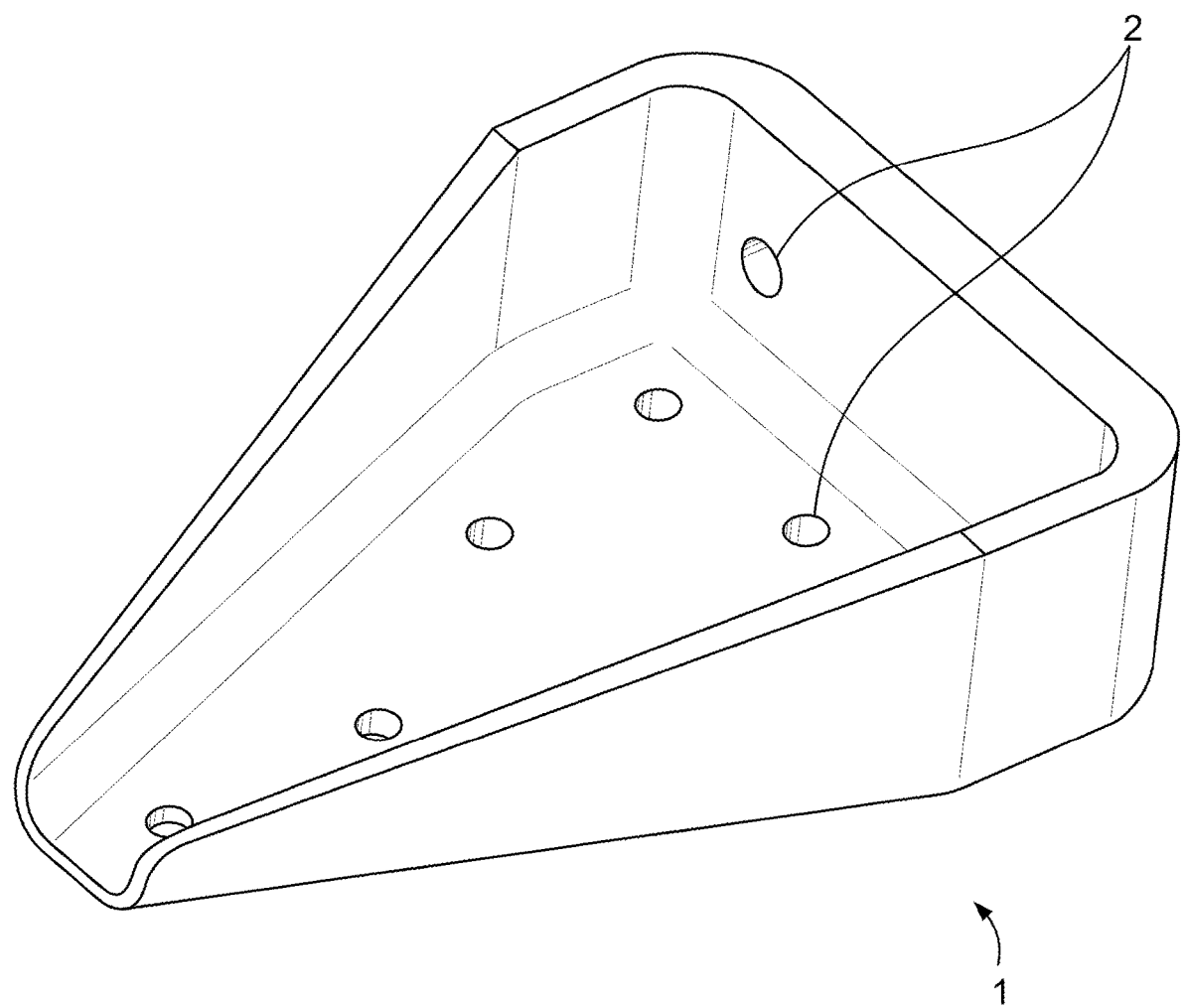
FIG. 1 is a diagrammatic representation of a perspective view of a finished thermoplastic composite part of this disclosure.

The thermoplastic composite parts and the methods of manufacturing such parts can be exemplified by describing a large number of differing fittings and parts used in a variety of industries. Each of these differing parts would include designs of simple to complex geometries. For the sake of clarity and brevity, the following disclosure describes just one of the many possible embodiments of the thermoplastic composite part covered by the claims of this disclosure. This one example of a thermoplastic composite part is illustrated in FIG. 1 as fitting 1, which can be used to secure an airplane seat to a floor track. Fitting 1 represents the finished part having a "bathtub" shape and includes a number of attachment components 2. The thermoplastic used to fabricate fitting 1 can be selected from a number of polymers in the polyaryletherketone (PAEK) family, including but not limited to polyether ketone ketone (PEKK) and polyether ether ketone (PEEK). Other possible thermoplastics include, but are not limited to, PEI (polyetherimide), PI polyimide, PAI polyamideimide, LCP liquid crystal polymers, PPS polyphenylene Sulfide, PC polycarbonate, PPSU polyphenylsulfone and others like materials.

Figure 6:
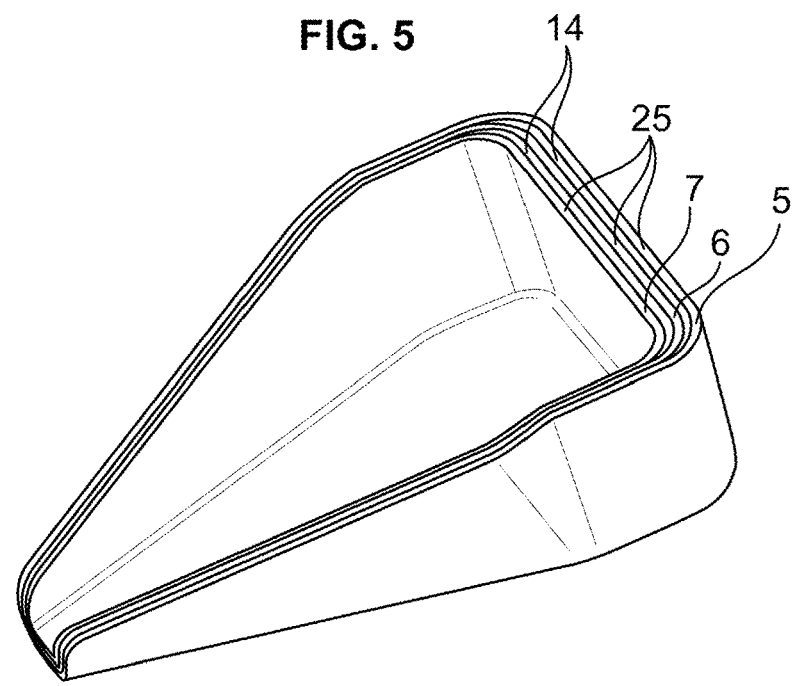
FIG. 6 is a diagrammatic representation of consolidated nested shells showing the shared melt zones that bond the shells together.

The finished fitting 1 is fabricated using a two or more shells 5, 6, 7, one or more doublers 14 (see FIG. 6), and possibly other structural components, such a metallic reinforcements or attachment features (see FIG. 7), where each shell is individually prepared from a pattern 4 (see FIG. 4) using a thermoforming procedure. Pattern 4 can be a flat sheet or ply of a thermoplastic fiber matrix that is cut to a specific design such that the desired shape of the shell is created in the thermoforming process. The fibers that can be incorporated in the thermoplastic include, but are not limited to, carbon fibers, fiberglass, KEVLAR® ARAMID®, quartz, and similar fiber materials. Fabrics with high fiber content of up to 40 wt. % can also be used. The use of resin tapes with a high fiber content of about 35 wt. % can also be used alone or in addition the use of fabrics. Because multiple shells are nested according to the present disclosure, individual shells can be fabricated with specific fiber orientation, which is predetermined to be oriented to the expected loads of the finished part. When fibers are used to fabricate the fittings and parts of the present invention, the thermoplastic content can be as low as about 60 wt. %. In other words, the present disclosure allows for higher fiber loading compared to known injection molding processing of parts.

Figure 2:
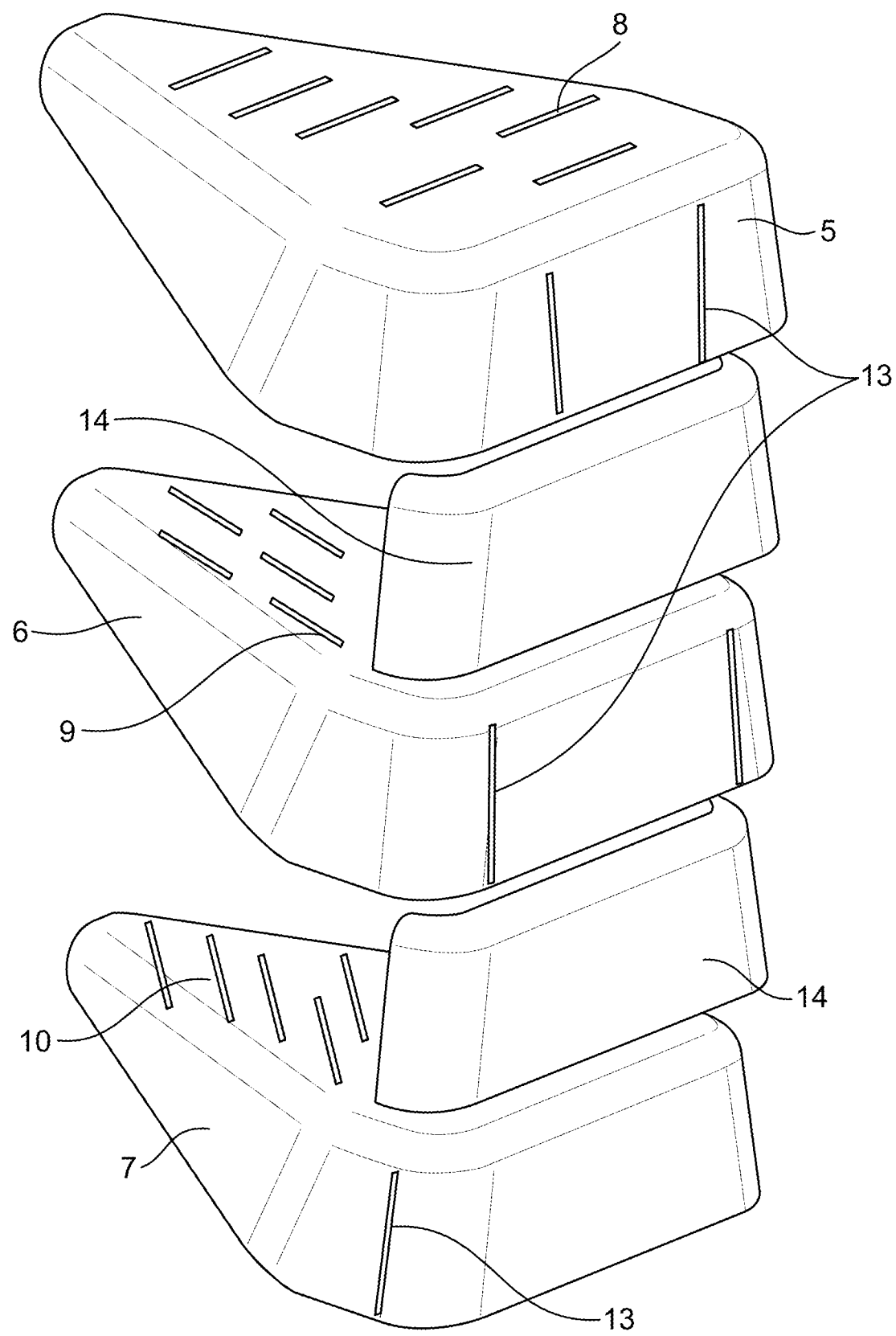
FIG. 2 is a diagrammatic representation of a perspective view of blow-up thermoplastic composite part showing the shells and doublers.

Pattern 4 can also be prepared by cutting the pattern from thermoplastic tapes that exhibit a low drape characteristic at room temperature. When reinforcing fibers are present in the thermoplastic, the pattern is prepared such that a selected or predetermined fiber orientation is achieved that will translate to and be maintained in the thermoformed shell. Although the patterns used for fabricating the series of shells that are eventually nested to form the final part are generally the same shape, the fiber orientation of each pattern can be different such that a predetermined fiber orientation of the finished thermoplastic composite part is obtained in order to achieve a desired final mechanical property. FIG. 2 schematically illustrates how shells 5, 6, and 7 could have differing fiber orientations 8, 9, and 10. Of course, each shell could have the same fiber orientation or two more shells could have the same orientation and the other shells could have differing orientations.

Figure 3:
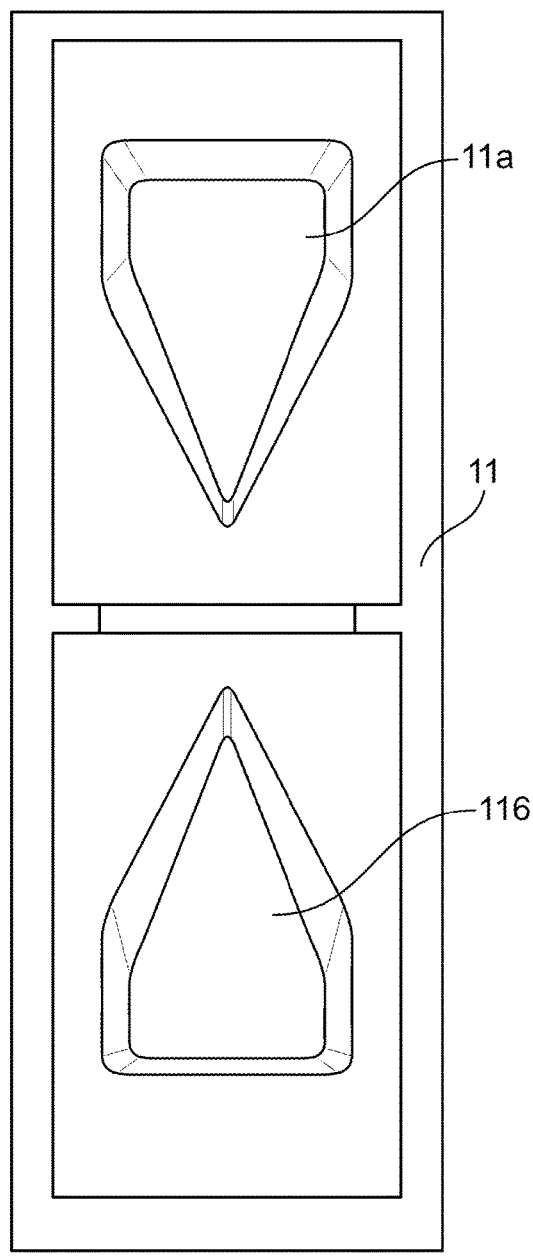
FIG. 3 is a diagrammatic representation of one possible thermoforming tool used to fabricate a shell.
Figure 4:
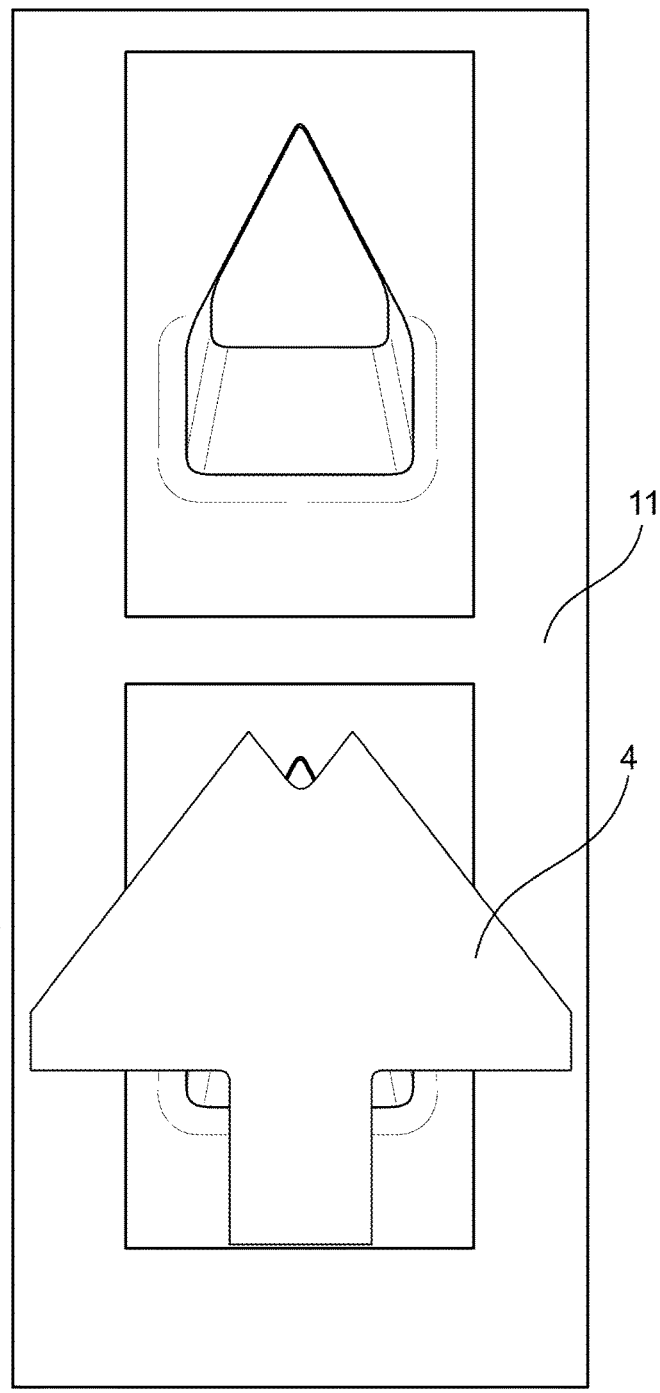
FIG. 4 is a diagrammatic representation of one possible thermoplastic pattern position on the tool of FIG. 3.

To obtain the individual shells that will be used to form the nest in the final mold 20 (see FIG. 5), patterns 4 are prepared and then thermoformed using a tool like the male/female tool 11 shown in FIG. 3. FIG. 4 shows pattern 4 placed on tool 11 prior to the tool being heated and a ram used to press the male side 11a of the tool into the female side 11b to conform the pattern 4 to the shape of the female side 11b of tool 11 to produce a single shell. In some cases a single shell can have up to 24 plies. Because the shells are nested in the final mold, each single shell produced is basically the same shape as the other shells, but each has a slightly smaller overall dimensions to allow the individual shells to be nested or stacked within the final mold before consolidation. The temperature and pressure used to thermoform the shells using the tool 11 is generally in the range of from about 170° C. to about 390° C. depending on the specific polymer type and about 100 psi (689 Kilopascals) to about 400 psi (2,757 Kilopascals), respectively. Temperature hold times can be from about 5 min. to about 60 min. depending on the thickness of the part being fabricated. Uniform temperature to the middle of the part is desirable. Once cooled the shell is removed from the tool.

Once a series of shells is obtained as shown in FIG. 2, the shells can be further processed to add folding darts, scores, through-cuts or slits 13 to one or more shells 5, 6, and 7. These darts are placed in predetermined locations on the shell so that when the shells are nested, the darts are staggered relative to each other. The use of darts allows the nested shells to conform easier to the contours of the final mold 20. Doublers 14 can also be used to increase the thickness of certain areas of the part in order to customize the thickness of the finished composite part in selected areas of the part. The doublers 14 can be fabricated using the same or different thermoplastic material used to make patterns 4, with or without the use of reinforcing fibers. When a doubler is fabricated without fibers added, i.e., only thermoplastic is used, it is referred to as a doubler fabricated with neat thermoplastic. Doublers can also have a number of plies, for example from 2-24 plies of thermoplastic material comprising reinforcing fibers, such that the doublers have a defined fiber orientation. This predefined fiber orientation can be the same or different than that of the individual shells.

Figure 7:
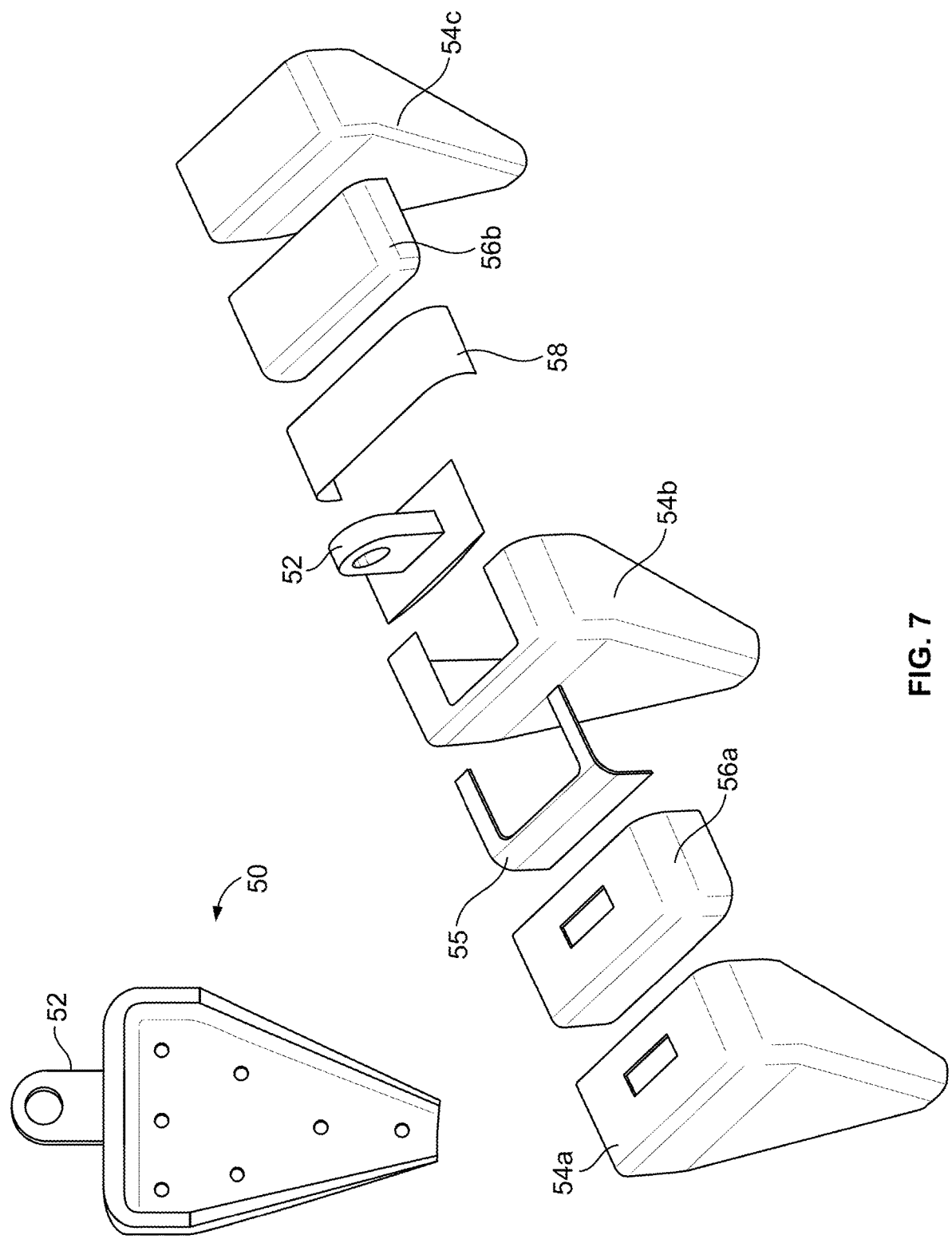
FIG. 7 is a diagrammatic representation of finished part with an attachment feature and a perspective blow-up of the shells, doublers, and tool index used to form the finished part.

Attachment components 2 can be used so that the finished thermoplastic part can be connected to other structures. These attachment components 2 include, but are not limited to, through-holes, lugs, bearing supports, and sub-fittings. The attachment fittings can be incorporated by adding one or more attachment components 2 during the formation of individual shells or during consolation of the nested shells in the final mold 20. FIG. 7 illustrates one example of a finished part 50 having an integrated attachment feature shown as a metallic lug 52. Part 50 includes shells 54a, 54b, and 54c as well as partial shells 56a and 56b. A metallic insert 58 is also used to provide additional strength. To fix the attachment feature 52 in place during the thermoforming process, a tool index 55 can be used.

Figure 5:
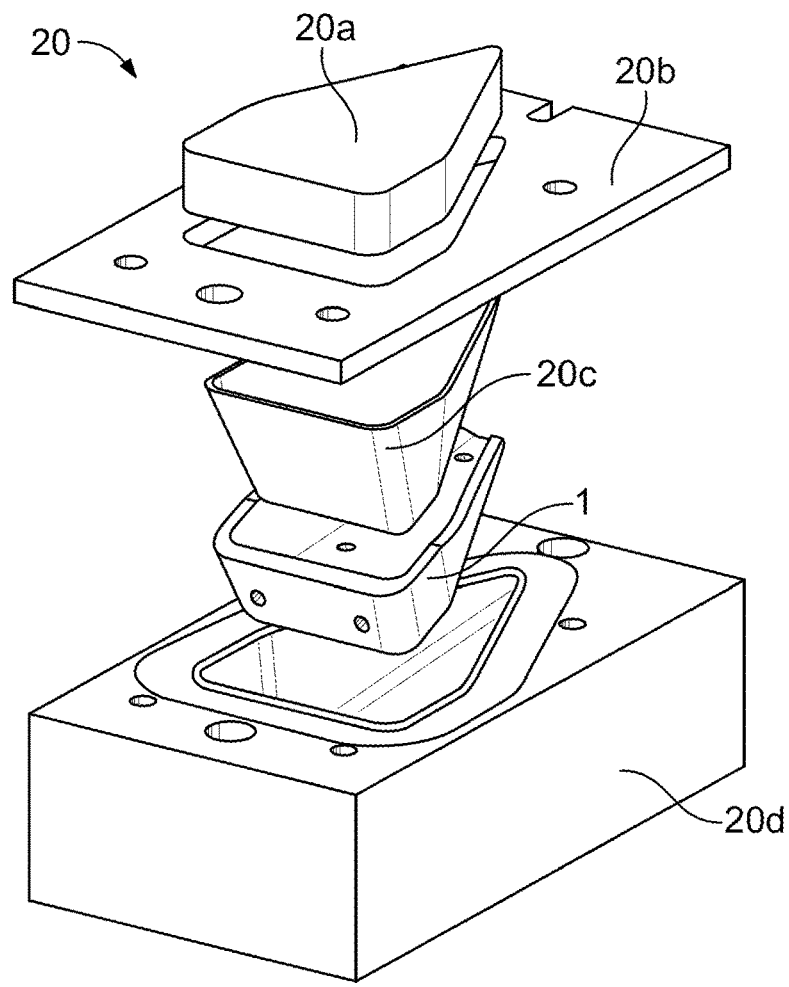
FIG. 5 is a diagrammatic representation of one possible final mold used to thermoform the thermoplastic composite part of this disclosure.

After individual shells 5, 6 and 7 are prepared using a number of patterns 4 in different tools 11 as shown in FIGS. 3 & 4, a final mold 20 is then used to form the final finished composite part 1. Tool 11 is representative of a number of such tools, each having different dimensions such that two or more shells with differing dimensions can be fabricated so that the shells can be nested together. Likewise, pattern 4 is representative of a number of patterns that can be used for different tools 11. FIG. 5 shows one example of a final mold 20 having a ram 20a, a frame 20b, a male tool 20c, and a female tool 20d, where finished thermoplastic composite part or fitting 1 is illustrated in its final trimmed condition. With the frame 20b, ram 20a, and male tool 20c removed, the individual single shells are nested into the female tool 20d until the desired number shells is added. Depending on the design of the part or fitting being fabricated, as few as two shells can be used and as many as 15 or more shells and doublers can be nested together. Once the nest is formed, the male tool 20c, frame 20b and ram 20a is reassembled, and mold 20 is subjected to a thermoforming process. In some cases a vacuum can be applied to the mold 20 to assist in the consolidation.

The temperature and ram pressure used to thermoform the nested sheik is generally in the range of from about 170° C. to about 390° C. depending on the specific polymer type and about 100 psi (689 Kilopascals) to about 400 psi (2,757 Kilopascals). Temperature hold times can be from about 10 min. to about 60 min. or more to ensure that the proper temperature is reached in the middle of the part or fitting 1. In general, the thermoforming conditions are such that a shared melt zone 25 (see FIG. 6) is formed between adjacent shells and/or doublers when they are used. The shared melt zone 25 bonds one shell to an adjacent shell and/or to a doubler. The melt zone(s) can also serve to fix or bond an attachment component to the nested shells. To finish the consolidation of the nested shells into an integral thermoplastic composite part, the mold 20 is cooled to a demold temperature where the shared melt zone 25 fully solidifies to bond all of the nested shells together. The composite part or fitting 1 is removed from the mold 20 and then further processed, such as trimmed.

The present disclosure is also directed to final composite parts or fittings that are thermoplastic composites that are prepared from two or more prefabricated shells that are bonded to each other through a shared melt zone, where each shell prior to bonding has substantially the same shape such that the shells can be assembled into a nest prior to the nest being subjected to heat and pressure to form the shared melt zone. Doublers and attachment components can be inserted between adjacent individual prefabricated shells during the fabrication process. Additionally, the prefabricated shells may comprise attachment components, multiple plies, and/or oriented fibers.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. A composite part comprising:
   a first prefabricated shell of thermoplastic configured as a first shape substantially the same as the composite part;
   a second prefabricated shell of thermoplastic configured as a second shape that is substantially the same as the first shape; and
   one or more doublers positioned between the first and second prefabricated shells,
   wherein the first shape and second shape have dimensions such that the first and second prefabricated shells are configured for assembly into a nest for placement into a mold for forming the composite part,
   wherein the first prefabricated shell is bonded to the one or more doublers with a first shared melt zone positioned between the first prefabricated shell and the one or more doublers,
   wherein the second prefabricated shell is bonded to the one or more doublers with a second shared melt zone positioned between the second prefabricated shell and the one or more doublers, and
   wherein the first and second prefabricated shells comprise reinforcing fibers.

2. The composite part of claim 1, wherein the one or more doublers comprise neat thermoplastic.

3. The composite part of claim 1 wherein the first prefabricated shell has reinforcing fibers that are oriented relative to the reinforcing fibers in the second prefabricated shell such that a predetermined fiber orientation of the composite part is achieved.

4. The composite part of claim 1 further comprising an attachment component.

5. The composite part of claim 4 wherein the attachment component is metallic and is positioned between the adjacent prefabricated shells in the nest.

6. The composite part of claim 4 wherein the attachment component comprises one or more of a lug, a bearing, a sub-fitting, or combination thereof.

7. An assembly for forming the composite part of claim 4, comprising a tool index to fix the attachment component relative to the prefabricated shells during integration of the attachment component into the composite part.

8. A method of manufacture of a composite part, the method comprising:
   assembling a first prefabricated shell of thermoplastic, a second prefabricated shell of thermoplastic, and one or more doublers between the first prefabricated shell and the second prefabricated shell to form a nest, the first prefabricated shell having a first shape substantially the same as the composite part, the second prefabricated shell having a second shape that is substantially the same as the first shape, and wherein the first and second prefabricated shells comprise reinforcing fibers;
   placing the assembled nest within a mold;

applying heat and pressure to the nest to thermoform or compression mold the nest within the mold to create (i) a first shared melt zone between the first prefabricated shell and the one or more doublers that bonds the first prefabricated shell to the one or more doublers and (ii) a second shared melt zone between the second prefabricated shell and the one or more doublers that bonds the second prefabricated shell to the one or more doublers, to produce a formed thermoplastic composite part; and cooling and removing the formed thermoplastic part from the mold.

9. The method of claim 8, further comprising thermoforming or compression molding the nest using patterns comprising a thermoplastic material.

10. The method of claim 9 wherein the patterns comprise reinforcing fibers and the thermoform or compression molding of the nest produces shells having a defined fiber orientation.

11. The method of claim 10 wherein the shells are assembled into the nest such that the fiber orientations of the shells is according to a predetermined design.

12. The method of claim 8 wherein the shells have folding darts, the method further comprising aligning the folding darts in a predetermined staggered pattern during assembly of the nest.

13. The method of claim 8 further comprising adding an attachment component during the thermoforming of the nest.

14. The method of claim 8 further comprising adding an attachment component during the assembly of the nest.

15. A composite part comprising:

a first prefabricated shell of thermoplastic configured as a first shape substantially the same as the composite part;

a second prefabricated shell of thermoplastic configured as a second shape that is substantially the same as the first shape; and one or more doublers positioned between the first and second prefabricated shells, wherein the first shape and second shape have dimensions such that the first and second prefabricated shells are configured for assembly into a nest for placement into a mold for forming the composite part, wherein the first prefabricated shell is bonded to the one or more doublers with a first shared melt zone positioned between the first prefabricated shell and the one or more doublers, wherein the second prefabricated shell is bonded to the one or more doublers with a second shared melt zone positioned between the second prefabricated shell and the one or more doublers, the composite part further comprising an attachment component that is metallic and is positioned between the adjacent prefabricated shells in the nest.

\* \* \* \* \*